United States Patent [19]
Chen

[11] Patent Number: 5,333,893
[45] Date of Patent: Aug. 2, 1994

[54] DUAL-SEAT STROLLER

[76] Inventor: Shun M. Chen, P.O. Box 82-144, Taipei, Taiwan

[21] Appl. No.: 3,654

[22] Filed: Jan. 13, 1993

[51] Int. Cl.$^5$ .............................................. B62B 7/08
[52] U.S. Cl. ................... 280/642; 280/652; 297/245; 108/177
[58] Field of Search ................. 280/639, 38, 641, 642, 280/643, 644, 647, 649, 650, 655, 657, 658; 297/243, 245, 68, 71, 77; 108/113

[56] References Cited

U.S. PATENT DOCUMENTS

| | | | |
|---|---|---|---|
| 4,706,986 | 11/1987 | Kassai | 280/642 |
| 4,746,140 | 5/1988 | Kassai | 280/650 |
| 5,050,900 | 9/1991 | Lee | 280/642 |

*Primary Examiner*—Richard M. Camby
*Attorney, Agent, or Firm*—Alfred Lei

[57] ABSTRACT

This invention relates to a dual-seat stroller and in particular to one including a front frame having arm members and connectors, a rear frame having arms members and connectors joined with the connectors of the front frame, leg members pivotally connected with the connectors and having a fixing block with a rod member, the rod member being formed with an engaging seat and a tubular member, two handles provided with a positioning seat pivotally connected with the tubular member and the rod member at one end and pivotally connected with the arm members, and linking rods pivotally connected with the arm members and leg members, linking rods connected with the arm members being pivotally connected with linking rods connected with the leg members, whereby the stroller may be expanded or collapsed as desired.

2 Claims, 7 Drawing Sheets

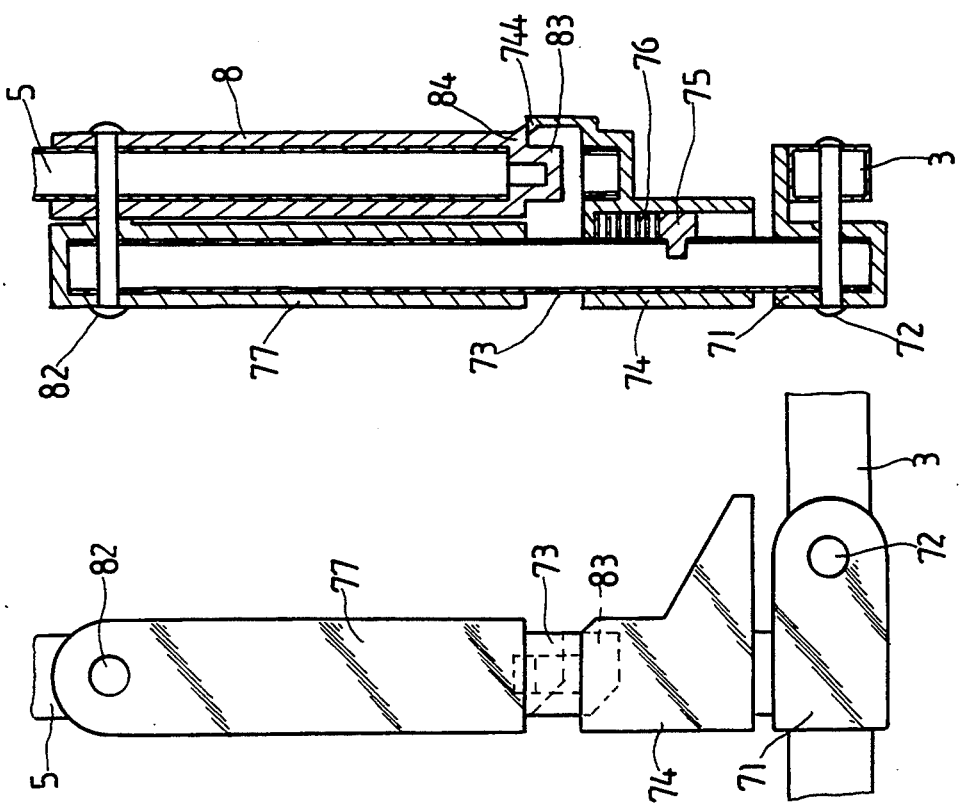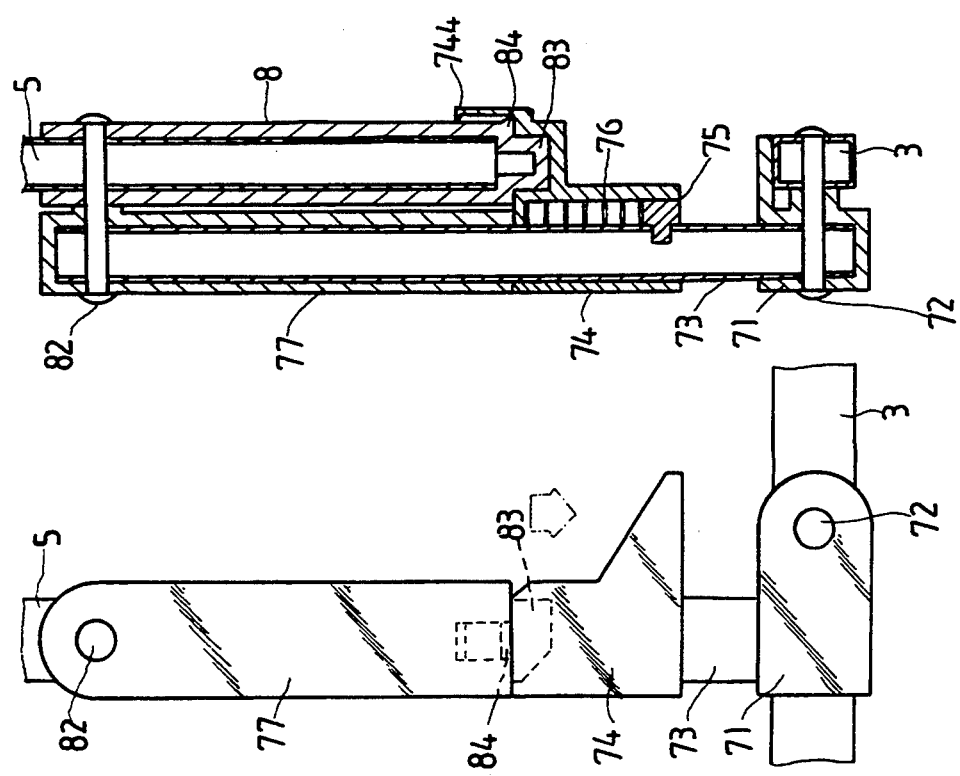

DUAL-SEAT STROLLER

BACKGROUND OF THE INVENTION

It is found that dual-seat strollers or baby carriages are known which have foldable frames of various configurations that are capable of being folded into a smaller size for easy carrying. However, only the rear seat of the such strollers can be lowered to enable the baby to lie down therein, hence making it unsuitable for use with two babies.

Therefore, it is an object of the present invention to provide a dual-seat stroller which may obviate and mitigate the above-mentioned drawbacks.

SUMMARY OF THE INVENTION

This invention relates to an improved dual-seat stroller.

It is the primary object of the present invention to provide a dual-seat stroller which may be collapsed when not in use.

It is another object of the present invention to provide a dual-seat stroller which is easy to operate.

It is still another object of the present invention to provide a dual-seat stroller which may enable the babies to lie down therein.

It is still another object of the present invention to provide a dual-seat stroller which is economic to produce.

It is still another object of the present invention to provide a dual-seat stroller which is simple in construction.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIGS. 4, 4A, 5 and 5A show the working principle of the present invention;

DETAILED DESCRIPTION OF THE PREFERRED EMBODIMENT

Figure 1:
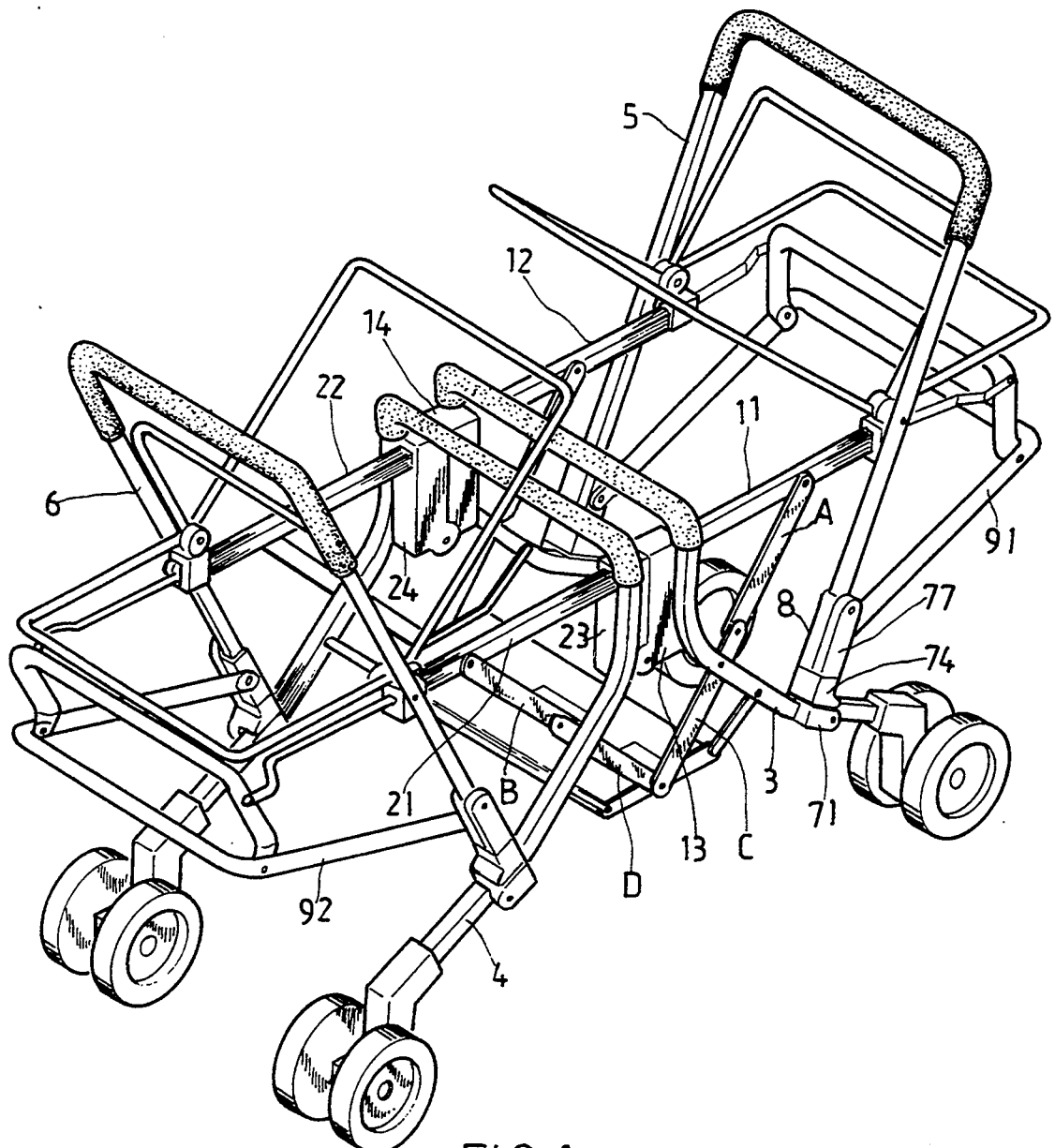
FIG. 1 is a perspective view of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
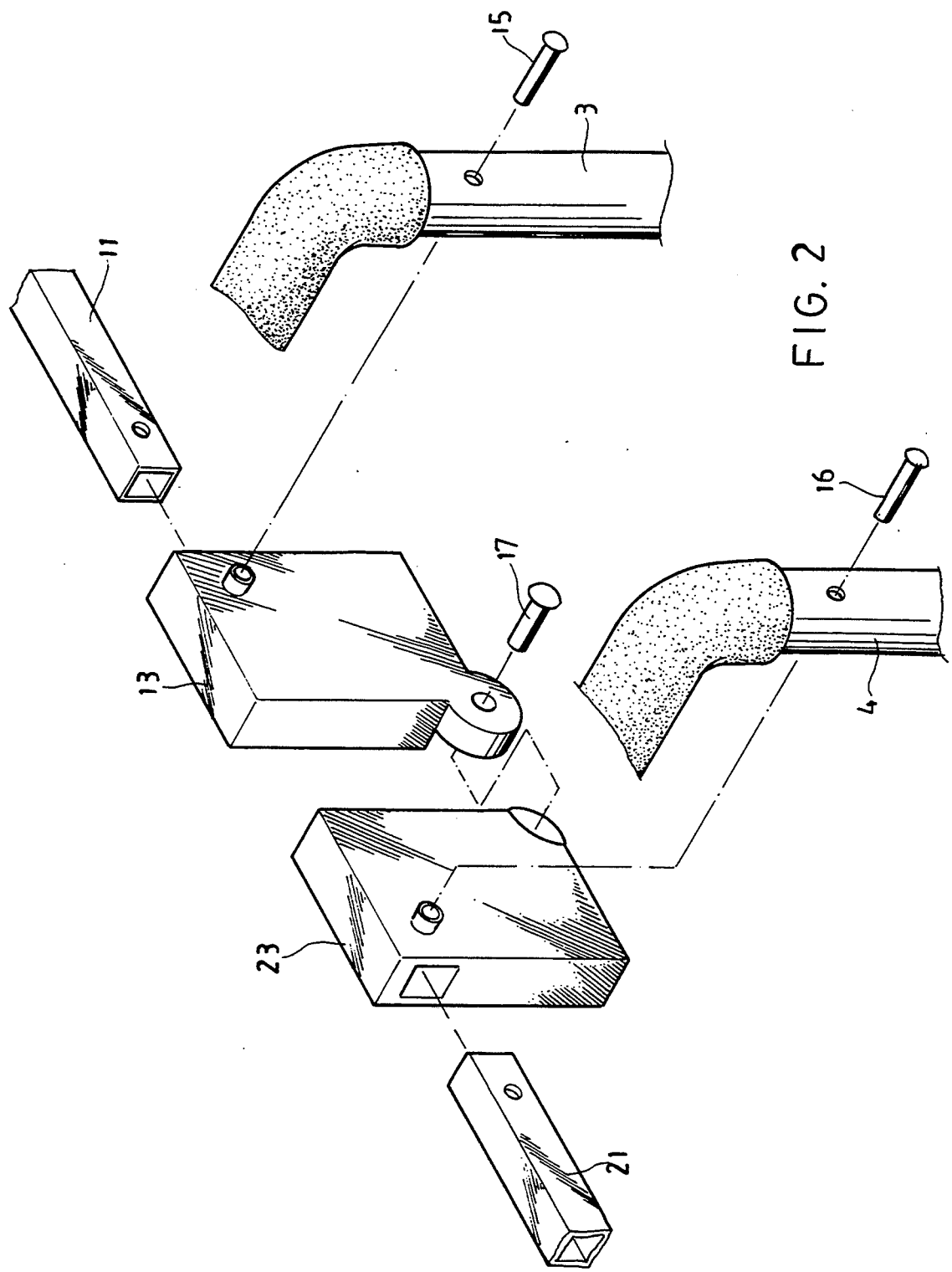
FIG. 2 shows the relationship between the arm members, the leg members, and the connectors.

With reference to the drawings and in particular to FIG. 1 thereof, the present invention mainly comprises a front frame and a rear frame which are identical in structure and so only the front frame will be described here in detail. The front frame is provided with two arm members 11 and 12, two leg members 3, a handle 5, and a back member 91. Looking now at FIG. 2, the arm member 11 is provided with a connector 13 which is connected with the leg member 3 and the arm member 11 by a rivet 15. The rear arm member 21 is connected with a connector 23 and a leg member 4 by another rivet 16. The connectors 13 and 23 are joined together by a rivet 17.

Figure 3:
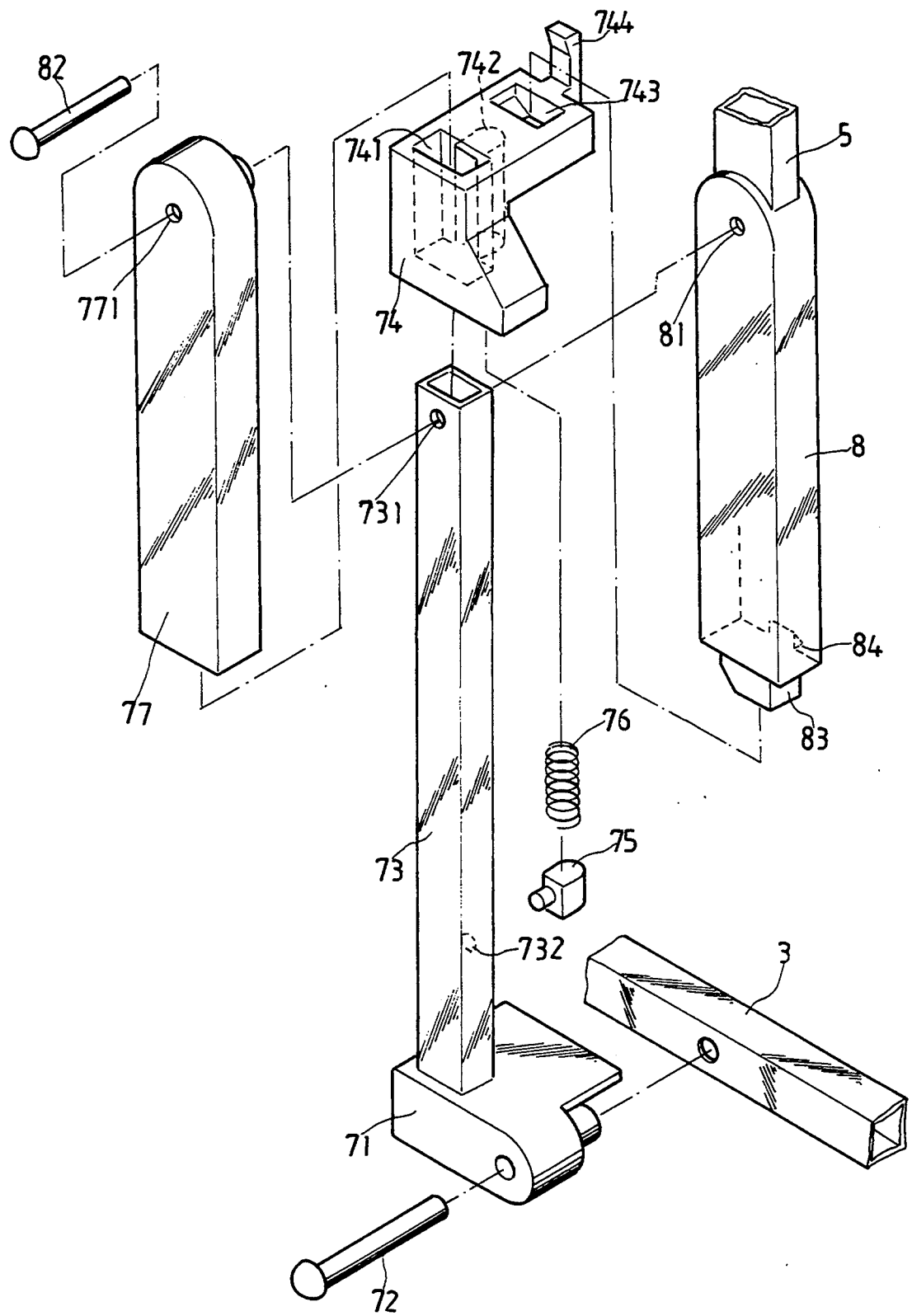
FIG. 3 shows the relationship between the engaging seat and the positioning seat.

As may be seen in FIGS. 1 and 3, the fixing block 71 is fixedly mounted on the leg member 3 via a rivet 72 and extends upwardly to form a rod member 73. The rod member 73 is formed with an upper hole 731 and a lower hole 732. An engaging seat 74 is connected with the rod member 73, which has a through hole 741 and a recess 742 in communication with the through hole 741. Further, The engaging seat 74 is provided with a positioning slot 743 and a hook 744. The engaging seat 74 is put onto the rod member 73 via through hole 741. A stopper 75 is engaged with the hole 732 of the rod member 73. In addition, the top of the stopper 75 is provided with a spring 76. The stopper 75 and the spring 76 are just received in the recess 742 so that the engaging seat 74 may move along the rod member 73. The rod member 73 is enclosed with a tubular member 77 which is provided with a hole 771 at the upper end. A positioning seat 8 is connected with an end of the handle 5 and has a hole 81. A rivet 82 extends through the hole 771 of the tubular member 77, the hole 731 of the rod member 73, and the hole 81 of the positioning seat 8 so that the handle 5 may be rotated about the rivet 82. The positioning seat 8 is provided at the bottom with a protuberance 83 and a hook 84 at one side. The relation among the fixing block 71, the rod member 73, the tubular member 77, the stopper 75, the spring 76, the positioning seat 8, the handle 5, and the leg members 3 are shown in FIGS. 4 and 5. As the positioning seat 8 is engaged with the engaging seat 74, the handle will be kept at a fixed position. When desired to collapse the handle 5, simply press the engaging seat 74 to disengage the hook 744 from the hook 84.

Referring to FIG. 1, the arm members 11 and 21 are pivotally connected with linking rods A and B. The leg members 3 and 4 are provided with linking rods C and D which are connected with the linking rods A and B. Further, the liking rods C and D are pivotally connected together. By means of the linking rods A, B, C and D, the arm members, the leg members, the handle, connector, the engaging seat, and the tubular member, the stroller may be expanded or folded as desired.

Figure 6:
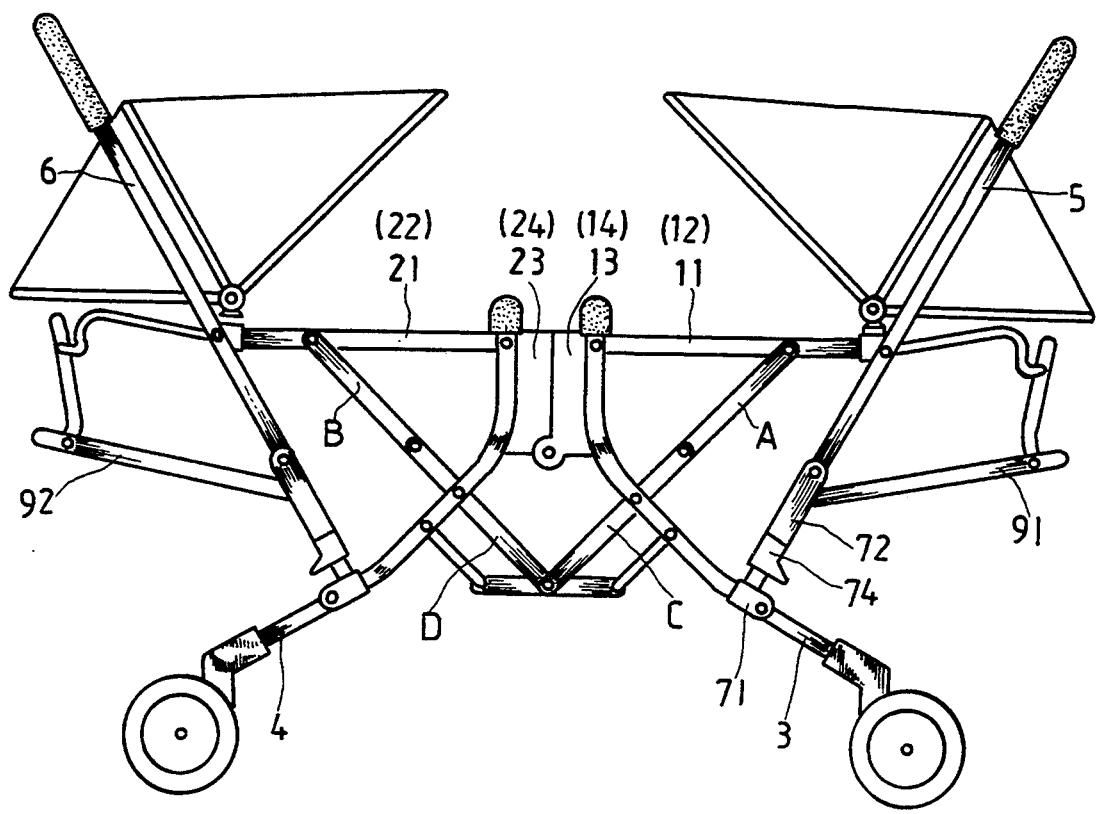
FIG. 6 shows the expanding condition of the present invention.
Figure 7:
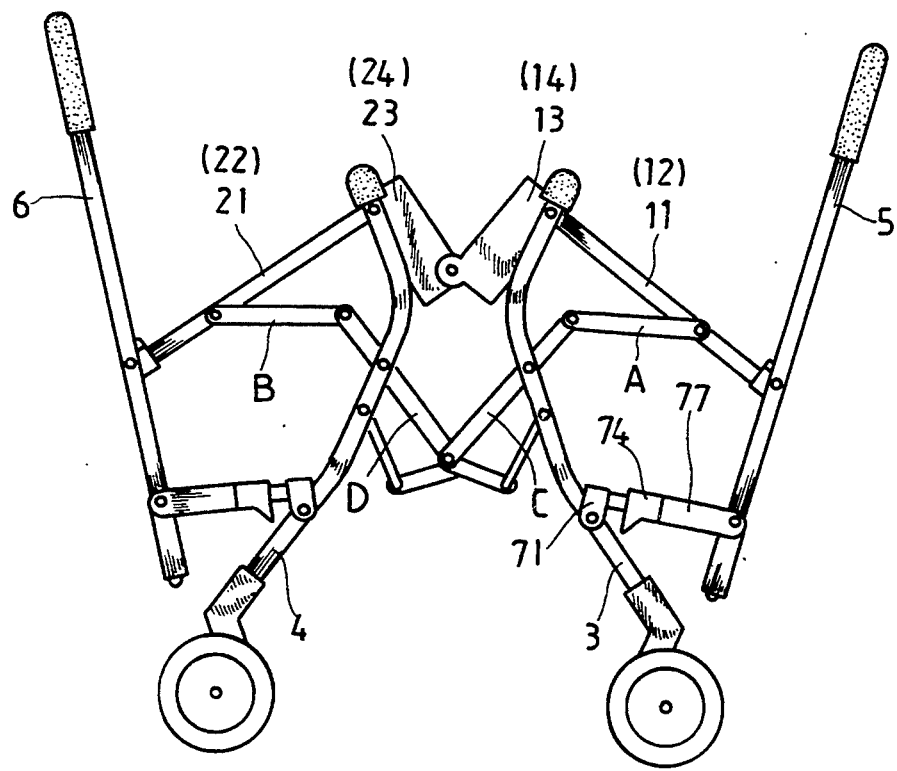
FIG. 7 shows the way to collapse the present invention.
Figure 8:
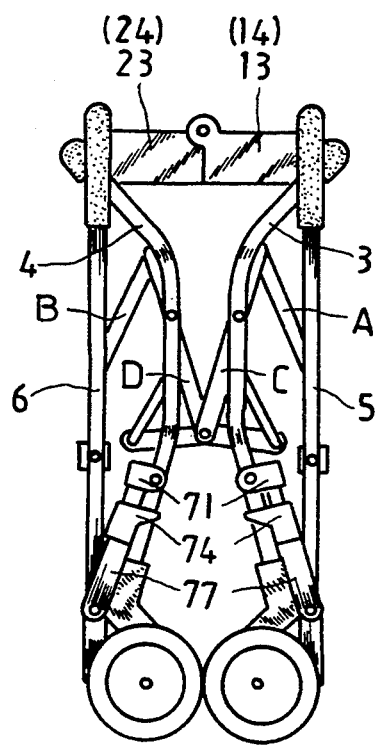
FIG. 8 shows the collapsed condition of the present invention.

The arm members 11 and 12 of the front frame are provided with connectors 13 and 14, while the arm members 21 and 22 of the rear frame with connectors 23 and 24. The connectors 13 and 23, 14 and 24 are pivotally connected. The handles 5 and 6 and the legs 3 and 4 are controlled by the rod member 73, the engaging seat 74 and the positioning seat 8. As shown in FIG. 6, when the engaging seat 74 is engaged with the positioning seat 8, the front frame and the rear frame will be expanded by the support of the connectors 13 and 23 and the linking rods A, B, C and D so that the back members 91 and 92 may be lowered thereby enabling two babies to lie down thereon. As the engaging seat 74 is disengaged with the positioning seat 8 and the connectors 13 and 23, 14 and 24, and the linking rods A, B, C and D are turned, the stroller may be collapsed as shown in FIGS. 7 and 8.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A dual-seat stroller comprising:

a front frame having two arm members each provided with a connector;

a rear frame having two arm members each provided with a connector;

four leg members each pivotally connected with one of the connector of said front frame and the connector of said rear frame and having a fixing block with a rod member, said rod member being connected with an engaging seat and a tubular member;

four handles each being provided with a positioning seat pivotally connected with said tubular member and said rod member at one end and being pivotally connected with one of the arm members of said front frame and said rear frame;

a pair of first linking rods each pivotally connected with one of the arm members of said front frame at one end;

a pair of second linking rods each pivotally connected with one of the arm members of said rear frame at one end;

a pair of third linking rods each pivotally connected at one end with another end of one of said first linking rods; and a pair of fourth linking rods each pivotally connected at one end with another end of one of said second linking rods and connected at another end with another end of one of said third linking rods.

2. The dual-seat stroller as claimed in claim 1, wherein said engaging seat is formed with a through hole, a recess in communication with said through hole, and a slot, said engaging sat being provided with a hook at one side and put onto said rod member, a spring received in said recess, a stopper mounted on said rod member, a positioning seat having a protuberance at the bottom engageable with said slot and a hook engageable with the hook of said engaging seat.

* * * * *